United States Patent Office 3,010,309
Patented Nov. 28, 1961

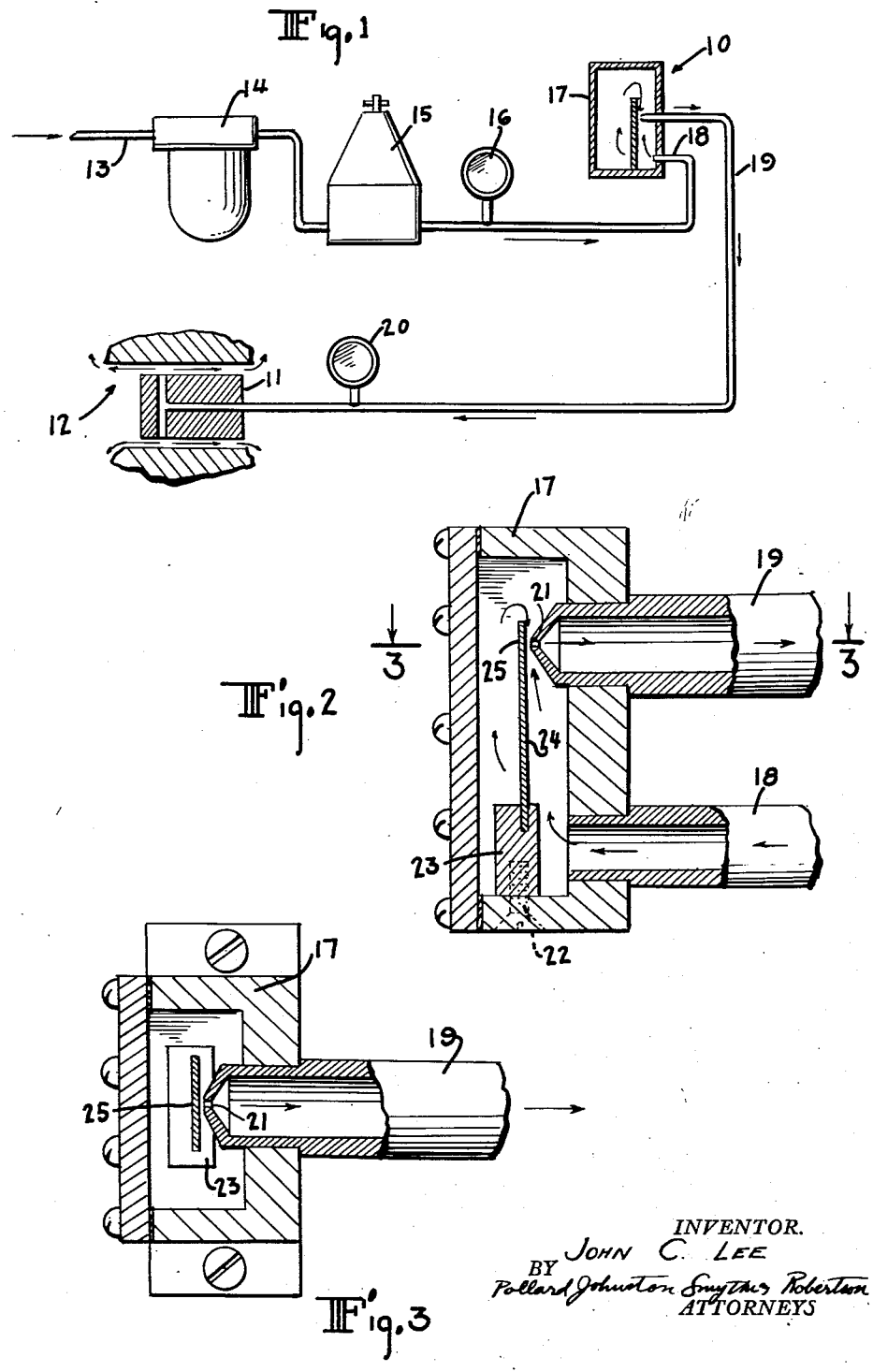

3,010,309
AIR GAUGING SYSTEM WITH A
FLAPPER VALVE
John C. Lee, Mount Prospect, Ill., assignor, by mesne assignments, to American Machine and Metals, Inc., New York, N.Y., a corporation of Delaware
Filed Oct. 25, 1957, Ser. No. 692,309
3 Claims. (Cl. 73—37.9)

This invention relates to valves, and particularly to a valve which varies the measuring air pressure of an air gauging device in accordance with the distance between the measuring surface of the gauging head and the surface to be measured.

In situations where the operating requirements of a fluid pressure system demand a variable output line pressure responsive to variations in the differential between input and output pressure, even though the input line pressure is substantially constant, conventional adjustable valves have been found to be inadequate. This is because conventional valves do not readily adjust automatically under operating conditions.

It is an object of this invention to provide a valve which varies the output pressure in accordance with variations in pressure differential even when the input pressure is constant.

It is a further object of this invention to provide a valve having a flexible flapper with its free end adjacent the output line orifice, so that it may move toward and away from the orifice as the differential in pressure between the input line pressure and the pressure at the input end of the output line varies.

The valve provided according to the invention is particularly adapted for use in controlling fluid flow from an input line to an output line in a fluid pressure system. It includes a resilient or flexible flapper fixed at one end and free at the opposite end. The free end of the flapper is positioned so that it is aligned with the inlet orifice of the output line. Under zero flow conditions, i.e., when the input line and output line pressures are equal, the free end of the flapper is spaced a predetermined distance from the inlet orifice. When the difference in pressures between the input line and the output line increases as the flow through the measuring head nozzles increases, the free end of the flapper tends to move toward the orifice causing a greater restriction in the orifice. This construction further results in decreasing the fluid flow to the measuring head when the pressure differential between the input and output lines increases, so as to increase the sensitivity of the air gauging device.

These and other objects, features and advantages of the invention will become apparent from the following detailed description and drawings which are merely exemplary.

In the drawings:

FIG. 1 is a schematic view of one fluid pressure system in which the valve of the invention may be used;

FIG. 2 is a side elevation in cross section of the novel valve of the invention; and FIG. 3 is a top plan view of the valve taken along the line 3—3 of FIG. 2.

As shown in FIG. 1, the valve 10 of the invention may be used in conjunction with an air gauging device which includes a measuring head 11 adapted to fit within a bore 12, the diameter of which is to be measured. The fluid or air enters line 13, passes through a filter 14, a pressure regulator 15, and a pressure gauge 16 and enters valve housing 17 through input line 18. The air then passes through output line 19, to pressure gauge 20 and then to measuring head 11. It is apparent that the valve of the invention may be used with any fluid pressure system where the pressure differential between input and output pressure varies.

The preferred form of the valve of the invention is best illustrated in FIGS. 2 and 3. Input line 18 and output line 19 may be attached to suitable openings in the housing 17 in sealed relation thereto, so that they communicate with the interior of said housing. Preferably, output line 19 has a reduced orifice 21 communicating with the interior of housing 17. Spaced from orifice 21 and connected to housing 17, as by a screw 22 or other suitable means, is a support or base 23. Attached to the support, by welding or the like, is a flexible flapper or plate 24 made from a resilient metal, such as beryllium copper. This flapper is thin enough, on the order of 0.017–0.022 inch, to permit it to be bent by the pressure differential between line 18 and line 19. The free end 25 of the flapper is aligned with orifice 21 so that as it is bent toward the orifice it restricts the flow of air through the orifice. In order to set a normal, or fixed, free flow pressure in line 19, free end 25 is spaced a predetermined distance from the orifice.

In order to obtain increased sensitivity in an air gauge measuring device, there should be a higher pressure in the output line when the distance between the measuring surface of the gauging head and the surface being measured is small. By changing the distance of flapper 24 from orifice 21, the slope of the curve used for measuring the surface, i.e., output pressure vs. clearance, is changed.

In the operation of the valve of the invention, as the differential between the pressure in input line 18 and the pressure in output line 19 is increased, due to the increase in the distance between the measuring surface of the gauging head and the surface being measured, free end 25 of flapper 24 is bent toward orifice 21, so as to restrict the flow of fluid therethrough and into line 19. Conversely, when head 11 is in close proximity to the wall of bore 12, the pressure in line 19 is relatively high, and free end 25 is further away from orifice 21.

It is to be understood that details of construction can be varied without departing from the spirit of the invention, except as defined in the appended claims.

What is claimed is:

1. In an air gauging system for measuring the dimensions of a workpiece, the combination comprising a source of fluid pressure, a measuring head having air passage means therethrough which is adapted to be placed adjacent the workpiece, the air passage means and the workpiece surface cooperating to form a first orifice area therebetween so that the dimension of said workpiece is measured as a function of the pressure drop across said orifice area, the size of said orifice area being determined in each case by the distance between said workpiece and said head, and a valve connected in series to said source of fluid pressure and said measuring head, said valve including a flexible flapper fixed at one end and free at the other end, said free end being aligned with and spaced, under zero flow conditions, a predetermined distance from an aperture which leads from said valve to said measuring head, said flapper and said aperture cooperating to form a second orifice area, said flapper being located nearer said aperture for greater distances between said head and said workpiece when there is flow through said system due to increased flow at said first orifice area which causes an increased pressure differential at said second orifice area to thereby permit said system to operate over a greater range of distances between said workpiece and said head.

2. In an air gauging system for measuring the dimensions of a bore, the combination comprising a source of fluid pressure, a measuring head having air passage means therethrough which is adapted to enter a bore, the air passage means and the bore wall cooperating to form a first orifice area therebetween so that the size of said bore is measured as a function of the pressure drop across said first orifice area, the size of said first orifice area being determined in each case by the distance between said bore wall and said head, and a valve connected in series to said source of fluid pressure and said measuring head, said valve including a flexible flapper fixed at one end and free at the other end, said free end being aligned with and spaced, under zero flow conditions, a predetermined distance from an aperture which leads from said valve to said measuring head, said flapper and said aperture cooperating to form a second orifice area, said flapper being located nearer said aperture for greater distances between said head and said bore wall when there is flow through said system due to increased flow at said first orifice area which causes an increased pressure differential at said second orifice area to thereby permit said system to operate over a greater range of distances between said wall bore and said head.

3. In an air gauging system for measuring the dimensions of a bore, the combination comprising a source of fluid pressure, a measuring head having air passage means therethrough which is adapted to enter a bore, the air passage means and the bore wall cooperating to form a first orifice area therebetween so that the size of said bore is measured as a function of the pressure drop across said first orifice area, the size of said first orifice area being determined in each case by the distance between said bore wall and said head, and a valve connected in series to said source of fluid pressure and said measuring head, said valve including a valve housing having an inlet port connected to said source of fluid pressure and an outlet port, a thin, sheet-like flexible flapper within said housing and fixed at one end to said housing and free at the other end, said free end being aligned with and spaced, under zero flow conditions, a predetermined distance from the outlet port which leads from said valve to said measuring head, said flapper and said outlet port cooperating to form a second orifice area, said flapper being located nearer said outlet port for greater distances between said head and said bore wall when there is flow through said system due to increased flow at said first orifice area which causes an increased pressure differential at said second orifice area to thereby permit said system to operate over a greater range of distances between said bore wall and said head.

References Cited in the file of this patent

UNITED STATES PATENTS

| | | |
|---|---|---|
| 886,834 | Michelin | May 5, 1908 |
| 1,768,110 | Boynton | June 24, 1930 |
| 2,217,380 | Pedder | Oct. 8, 1940 |
| 2,672,151 | Newbold | Mar. 16, 1954 |
| 2,684,079 | Krohm | July 20, 1954 |
| 2,767,733 | Anderson | Oct. 23, 1956 |
| 2,831,006 | Baker | July 1, 1958 |